(12) United States Patent
Maruno et al.

(10) Patent No.: US 11,307,829 B2
(45) Date of Patent: Apr. 19, 2022

(54) PROGRAMMING ASSISTANCE DEVICE, PROGRAMMING ASSISTANCE METHOD, AND COMPUTER-READABLE RECORDING MEDIUM

(71) Applicant: OMRON Corporation, Kyoto (JP)

(72) Inventors: Ryota Maruno, Kusatsu (JP); Naoto Hasegawa, Fareham (GB)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/171,454

(22) Filed: Feb. 9, 2021

(65) Prior Publication Data

US 2021/0165637 A1    Jun. 3, 2021

Related U.S. Application Data

(63) Continuation of application No. PCT/JP2019/028520, filed on Jul. 19, 2019.

(30) Foreign Application Priority Data

Aug. 22, 2018   (JP) .............................. JP2018-155598

(51) Int. Cl.
   *G06F 9/44*      (2018.01)
   *G06F 8/30*      (2018.01)
(52) U.S. Cl.
   CPC ..................................... *G06F 8/31* (2013.01)
(58) Field of Classification Search
   None
   See application file for complete search history.

(56) References Cited

U.S. PATENT DOCUMENTS 7,290,048 B1 * 10/2007 Barnett ............... G06F 11/3495
                                                                  709/223
7,756,882 B2 *  7/2010 Aharoni .................. G06F 16/86
                                                                  707/756

(Continued)

FOREIGN PATENT DOCUMENTS

| JP | 2000132210 A | 5/2000 |
| JP | 2017016312 A | 1/2017 |
| WO | 0161503 A1 | 8/2001 |

OTHER PUBLICATIONS

International Search Report for International Application No. PCT/JP2019/028520; dated Oct. 15, 2019.

(Continued)

*Primary Examiner* — Anna C Deng
(74) *Attorney, Agent, or Firm* — Cantor Colburn LLP

(57) ABSTRACT

In the present invention, a map information table is displayed as a list on a display screen. The map information table associates a reference name field representing each of the plurality of device ports with a set value field for each device port. It is determined whether a set value has been written on the set value field for each of the device ports regarding a first program in a first programming language. Writing of a set value on the set value field is prohibited regarding a second program in a second programming language, which is different from the first programming language, for a device port for which it is determined that a set value has been written on the set value field regarding a first program in the first programming language.

6 Claims, 8 Drawing Sheets

(56) References Cited

U.S. PATENT DOCUMENTS

| | | | |
|---|---|---|---|
| 10,073,764 B1* | 9/2018 | Sundermier | G06F 11/3692 |
| 10,642,896 B2* | 5/2020 | Bequet | G06N 3/084 |
| 11,119,798 B2* | 9/2021 | Tshouva | H04L 9/0643 |
| 2002/0174310 A1* | 11/2002 | Ueyama | G06F 12/1416 |
| | | | 711/163 |
| 2002/0194277 A1* | 12/2002 | Sakimura | G06Q 10/0637 |
| | | | 709/205 |
| 2004/0128307 A1* | 7/2004 | Repici | G06F 16/22 |
| 2008/0222198 A1* | 9/2008 | Wilkinson | G06F 8/4434 |
| 2013/0290377 A1* | 10/2013 | Purohit | G06F 16/86 |
| | | | 707/803 |
| 2015/0236453 A1* | 8/2015 | Magee, Jr. | H01R 13/70 |
| | | | 307/40 |
| 2015/0256709 A1* | 9/2015 | Sugimura | H04N 1/00474 |
| | | | 358/1.13 |
| 2020/0057781 A1* | 2/2020 | McCormick | G06F 16/81 |
| 2020/0219593 A1* | 7/2020 | Eteminan | G06F 3/04845 |

OTHER PUBLICATIONS

PCT Written Opinion of the International Searching Aurhority for International Application No. PCT/JP2019/028520; dated Oct. 15, 2019.

* cited by examiner

Fig.9

AFTER WRITING OF SET VALUE

MAP INFORMATION TABLE 300

PROGRAMMING ASSISTANCE DEVICE, PROGRAMMING ASSISTANCE METHOD, AND COMPUTER-READABLE RECORDING MEDIUM

CROSS-REFERENCE TO RELATED APPLICATION

This application is a continuation under 35 U.S.C. § 120 of PCT/JP2019/028520, filed Jul. 19, 2019, which is incorporated herein reference and which claimed priority to Japanese Application No. 2018-155598, filed Aug. 22, 2018, the entire content of which is hereby incorporated by reference.

TECHNICAL FIELD

The present invention relates to a programming assistance device and a programming assistance method that support program creation in a programming language. In addition, the present invention relates to a computer-readable recording medium storing a program for causing a computer to execute such a programming assistance method.

BACKGROUND ART

Conventionally, as a programming assistance device of this kind, there has been one that displays a map information table as disclosed in, for example, Patent Literature 1 (JP 2000-132210 A) on the display screen of a computer at the stage when a program author creates a program on the computer using a certain programming language. The map information table in the literature displays the reference name (symbol name, tag name) referred to by the program, in association with the actual physical memory, the physical I/O port, and the address (channel number) on the network shared memory which correspond to the reference name.

With this map information table displayed on the display screen, the program author writes, for example, a set value for a physical I/O port corresponding to a certain symbol name. Then, thereafter, overwriting of the set value on the physical I/O port is prohibited, which prevents erroneous writing on the physical I/O port (however, when a special operation to cancel the overwriting prohibition is performed, the set value can be written again). The program author creates programs while appropriately referring to the map information table in which the set values have been written in this way.

SUMMARY OF INVENTION

However, in the conventional programming assistance device, there is a problem that the function of prohibiting overwriting of set values on the physical I/O port extends only to the program creation in the programming language.

For example, in recent years, a system has been developed that integrates a programmable logic controller (PLC) engine for executing a sequence control program and a motion controller (MC) engine for executing a robot control program to control a robot. This system includes a plurality of physical I/O ports, and the respective set values set in those physical I/O ports are referred to by programs for driving sensors, motors, robots, and the like.

Traditionally, a ladder language is often used for creating a sequence control program. On the other hand, C language, C++, or each company's original programming language is often used for creating a robot control program. It is common practice that, if programming languages of programs are different, program authors different from each other are in charge of creating the respective programs from the viewpoint of proficiency and working efficiency.

Therefore, at the stage of creating the sequence control program and the stage of creating the robot control program, there is a possibility that each program author mistakenly writes a different set value on the same physical I/O port (the set value written earlier is overwritten by the set value written later). In that case, the set value of the physical I/O port is in a state not intended by the program author who wrote the set value first.

Thus, an object of the present invention is to provide a programming assistance device and a programming assistance method capable of exerting a function of prohibiting overwriting of a set value on a device port on program creation in a plurality of programming languages different from each other. In addition, an object of the present invention is to provide a computer-readable recording medium storing a program for causing a computer to execute such a programming assistance method.

In order to achieve the above object, a programming assistance device according to the present disclosure is a programming assistance device configured to support program creation in a plurality of programming languages for a system including a plurality of device ports, the programming assistance device comprising:

a display processing unit configured to display a map information table as a list on a display screen, the map information table associating a reference name field representing each of the plurality of device ports with a set value field for each device port;

a writing determination unit configured to determine whether a set value has been written on the set value field for each of the device ports regarding a first program in a first programming language; and an overwriting prohibition unit configured to prohibit writing of a set value on the set value field regarding a second program in a second programming language, which is different from the first programming language, for a device port for which it is determined that a set value has been written on the set value field regarding a first program in the first programming language.

Herein, the "device port" broadly refers to a port on which a set value to be referred to during program execution is to be written or has been written, such as a physical I/O (input/output interface) port.

In addition, writing of a set value on the set value field can be performed by an input via an operation unit such as a keyboard or a mouse.

In another aspect, a programming assistance method according to the present disclosure is a programming assistance method for supporting program creation in a plurality of programming languages for a system including a plurality of device ports, the programming assistance method comprising:

displaying a map information table as a list on a display screen, the map information table associating a reference name field representing each of the plurality of device ports with a set value field for each device port;

determining whether a set value has been written on the set value field for each of the plurality of device ports regarding a first program in a first programming language; and prohibiting writing of a set value on the set value field regarding a second program in a second programming language, which is different from the first programming language, for a device port for which it is determined that a set value has been written on the set value field regarding a first program in the first programming language.

In yet another aspect, a computer-readable recording medium according to the present disclosure is a computer-readable recording medium non-transitorily storing a program for causing a computer to perform the above programming assistance method.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 9 is a diagram showing a state after writing of a set value on the map information table.

DESCRIPTION OF EMBODIMENTS

Hereinafter, embodiments of the present invention will be described in detail with reference to the drawings.

Figure 1:
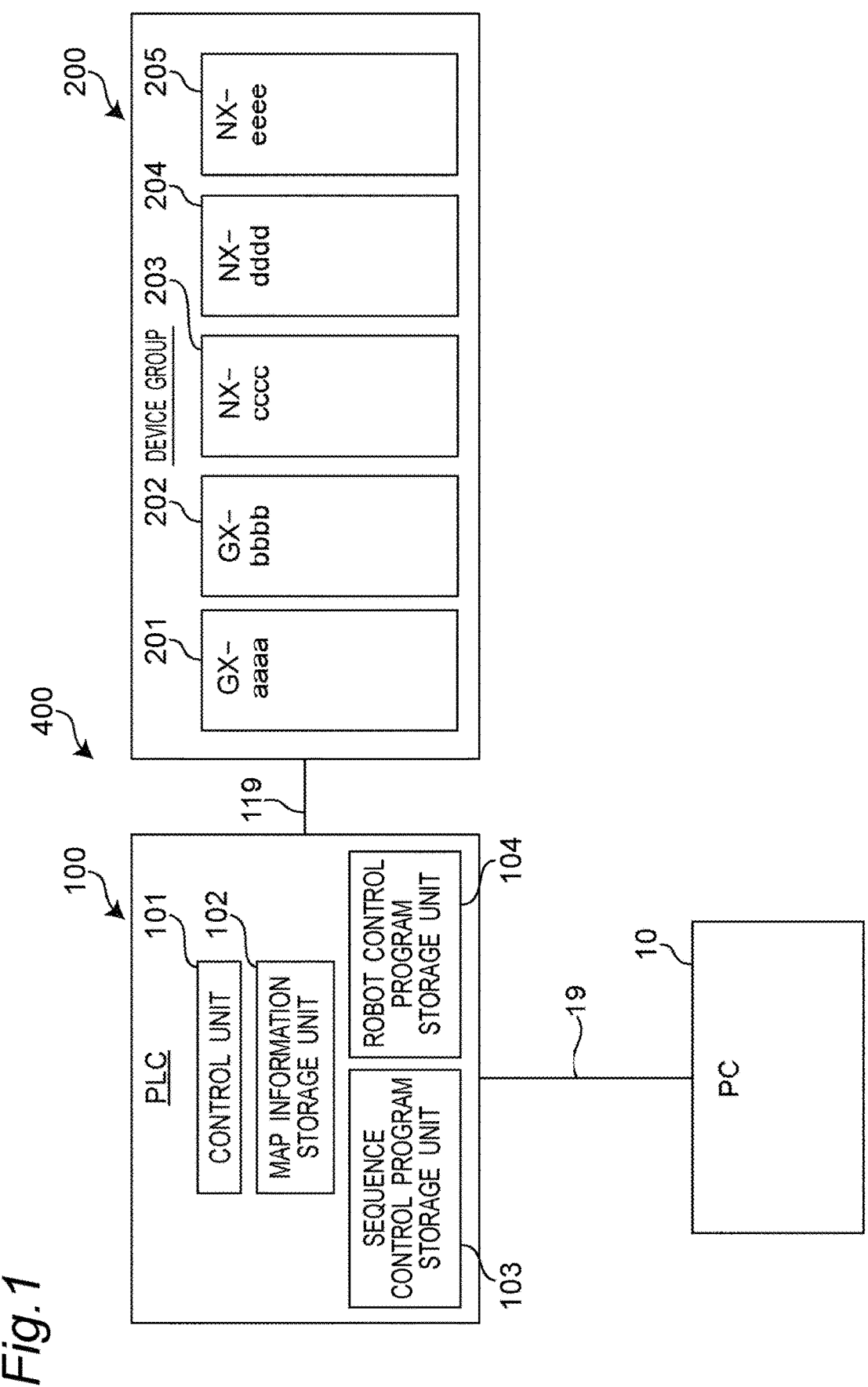
FIG. 1 is a diagram showing a schematic block configuration of a system to which a programming assistance device according to an embodiment of the present invention is applied.

FIG. 1 shows a schematic block configuration of a system 400 to which a programming assistance device according to an embodiment of the present invention is applied. This system 400 generally includes a personal computer (PC) 10 forming a programming assistance device, a programmable logic controller (PLC) 100 communicably connected to this PC 10 via a communication cable 19, and a device group 200 communicably (in this example, EtherCAT (registered trademark) communication) connected to this PLC 100 via a communication cable 119.

In this example, the device group 200 includes a first node 201 (reference name "Node1", model number "GX-aaaa"), a second node 202 (reference name "Node2", model number "GX-bbbb"), a third node 203 (reference name "Node3", model number "NX-cccc"), and a first unit 204 (reference name "Unit1", model number "NX-dddd") and second unit 205 (reference name "Unit2", model number "NX-eeee") which are communicably (in this example, EtherCAT (registered trade mark) communication) connected to the third node 203. Each of these devices 201 to 205 includes a plurality of physical I/O ports (hereinafter, simply referred to as "I/O ports") as device ports. The set values set for these I/O ports are referred to by programs that drive sensors, motors, robots, and the like (not shown).

Figure 3:
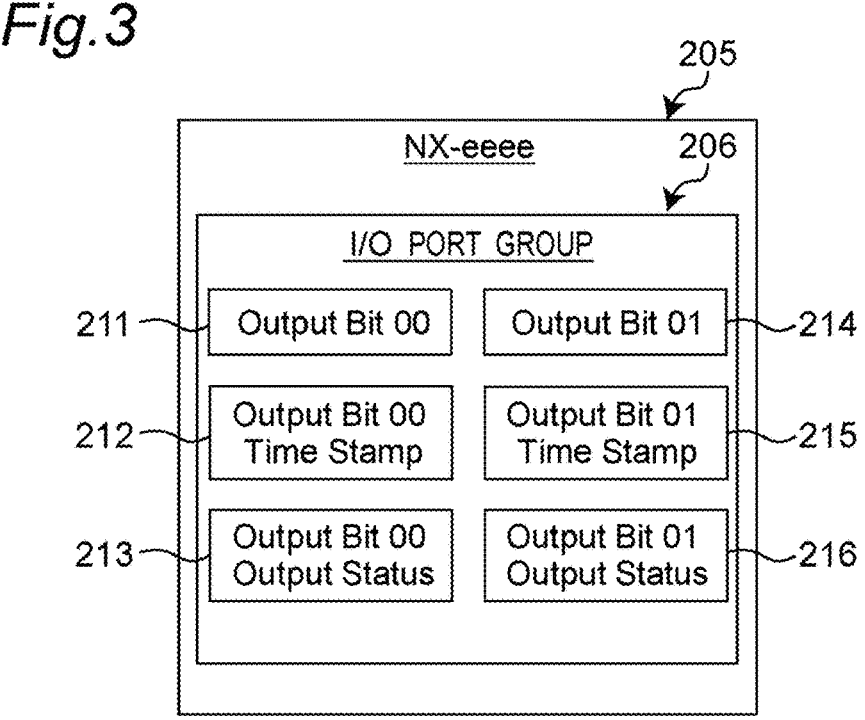
FIG. 3 is a diagram showing an I/O port group included in a second unit (model number "NX-eeee") forming a part of the above system.

For example, the second unit 205 (model number "NX-eeee") includes six I/O ports 211 to 216 as the I/O port group 206, as shown in FIG. 3. These I/O ports 211 to 216 are respectively denoted by reference names "Output Bit 00", "Output Bit 00 Time Stamp", "Output Bit 00 Output Status", "Output Bit 01", "Output Bit 01 Time Stamp", and "Output Bit 01 Output Status". In this example, the set values set for these I/O ports 211 to 216 are referred to by a program that drives a robot (not shown).

The PLC 100 shown in FIG. 1 includes a control unit 101, a map information storage unit 102, a sequence control program storage unit 103, and a robot control program storage unit 104.

The map information storage unit 102 associates the reference names corresponding to the plurality of I/O ports included in the system 400 with the set values and the like for each I/O port, and stores them including the hierarchical structure between the I/O ports as a map information table (described in detail below, with reference to FIGS. 7 to 9). Thus, the map information table includes a hierarchical structure between a plurality of I/O ports as a configuration list of the EtherCAT (registered trademark) network.

The sequence control program storage unit 103 shown in FIG. 1 stores a first program (sequence control program in this example) in a first programming language (ladder language LD in this example).

The robot control program storage unit 104 stores a second program (robot control program in this example) in a second programming language (language originally developed by the present applicant in this example).

During operation, the control unit 101 controls, for example, sensors, motors, and the like connected to the PLC100 itself while referring to the map information table stored in the map information storage unit 102 according to the "sequence control program" stored in the sequence control program storage unit 103. In parallel with that, the control unit 101 controls, for example, the motion of the robot via the I/O ports 211 to 216 of the second unit 205 described above while referring to the map information table 300 stored in the map information storage unit 102 according to the "robot control program" stored in the robot control program storage unit 104. Thus, the PLC100 performs a control operation integrated with sequence control by the sequence control program and robot control by the robot control program.

In this example, mainly as a programming assistance device, the PC 10 shown in FIG. 1 is provided to support the creation of a "sequence control program" stored in the sequence control program storage unit 103 and a "robot control program" stored in the robot control program storage unit 104.

Figure 2:
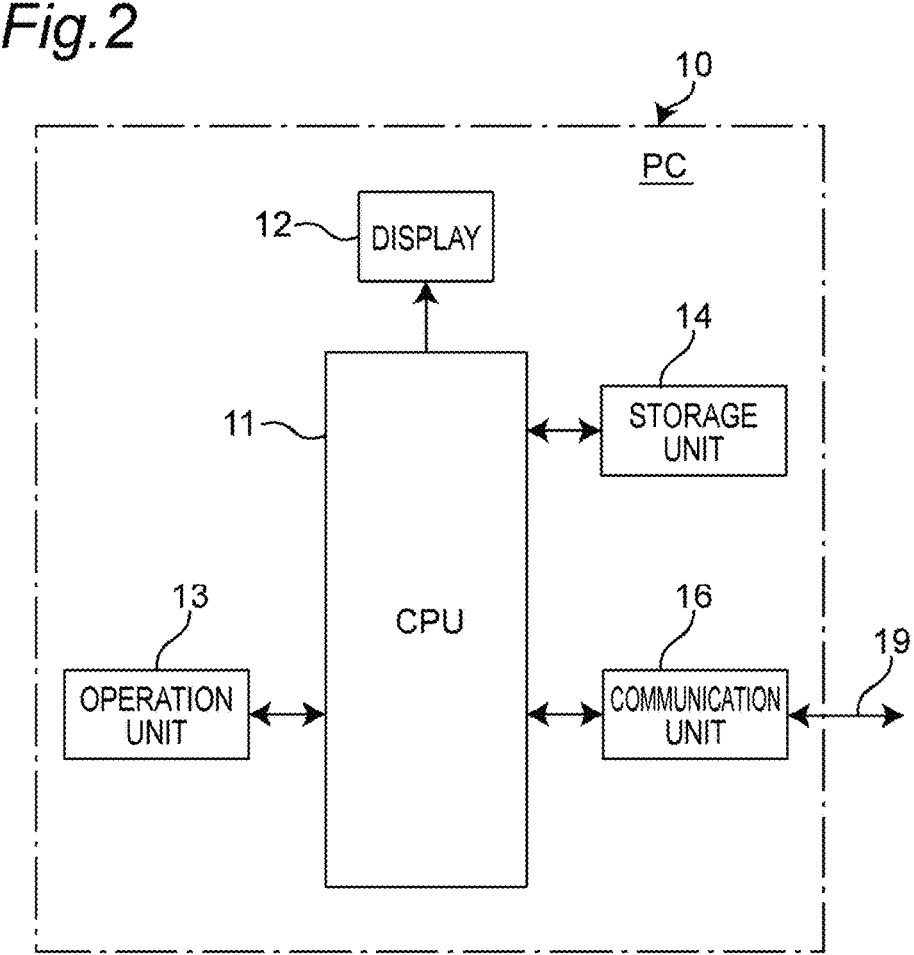
FIG. 2 is a diagram showing a block configuration of a personal computer (PC) forming the programming assistance device.

In this example, as shown in FIG. 2, the PC 10 includes a central processing unit (CPU) 11, a display 12, an operation unit 13, a storage unit 14, and a communication unit 16.

The CPU 11 is operated by software (computer program), and executes processing according to a programming assistance method described below and various other processing.

In this example, the display 12 includes a liquid crystal display element (LCD), and displays an image on the display screen according to a control signal from the CPU 11. In this example, the display 12 is used to display the map information table 300.

In this example, the operation unit 13 includes a keyboard and a mouse, and is used for inputting instructions and data from a user (operator).

In this example, the storage unit 14 includes an electrically rewritable non-volatile memory (EEPROM) capable of non-temporarily storing data and a random access memory (RAM) capable of temporarily storing data. Software (computer program) for controlling CPU 11 is stored in the storage unit 14. In addition, in this example, the contents of the map information table described above are stored in the storage unit 14. The memory contents will be described in detail below.

The communication unit 16 is controlled by the CPU 11 to transmit predetermined information to an external apparatus, and to receive information from the external apparatus to transfer it to the CPU 11. In this example, the communication unit 16 works to communicate with the PLC 100 via the communication cable 19.

Figure 4:
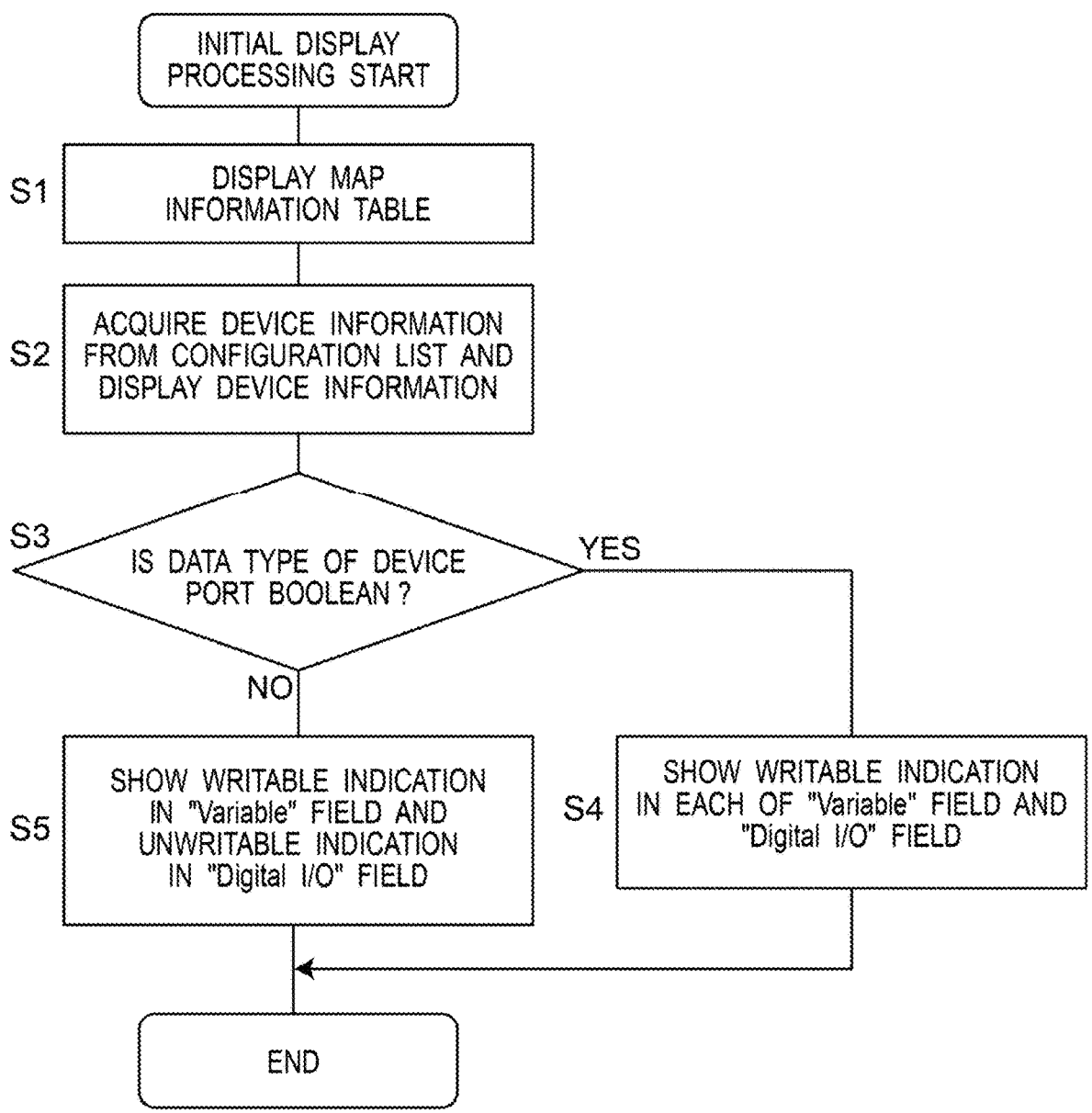
FIG. 4 is a diagram showing a flow of initial display processing of first displaying a map information table on the display screen of the programming assistance device.
Figure 5:
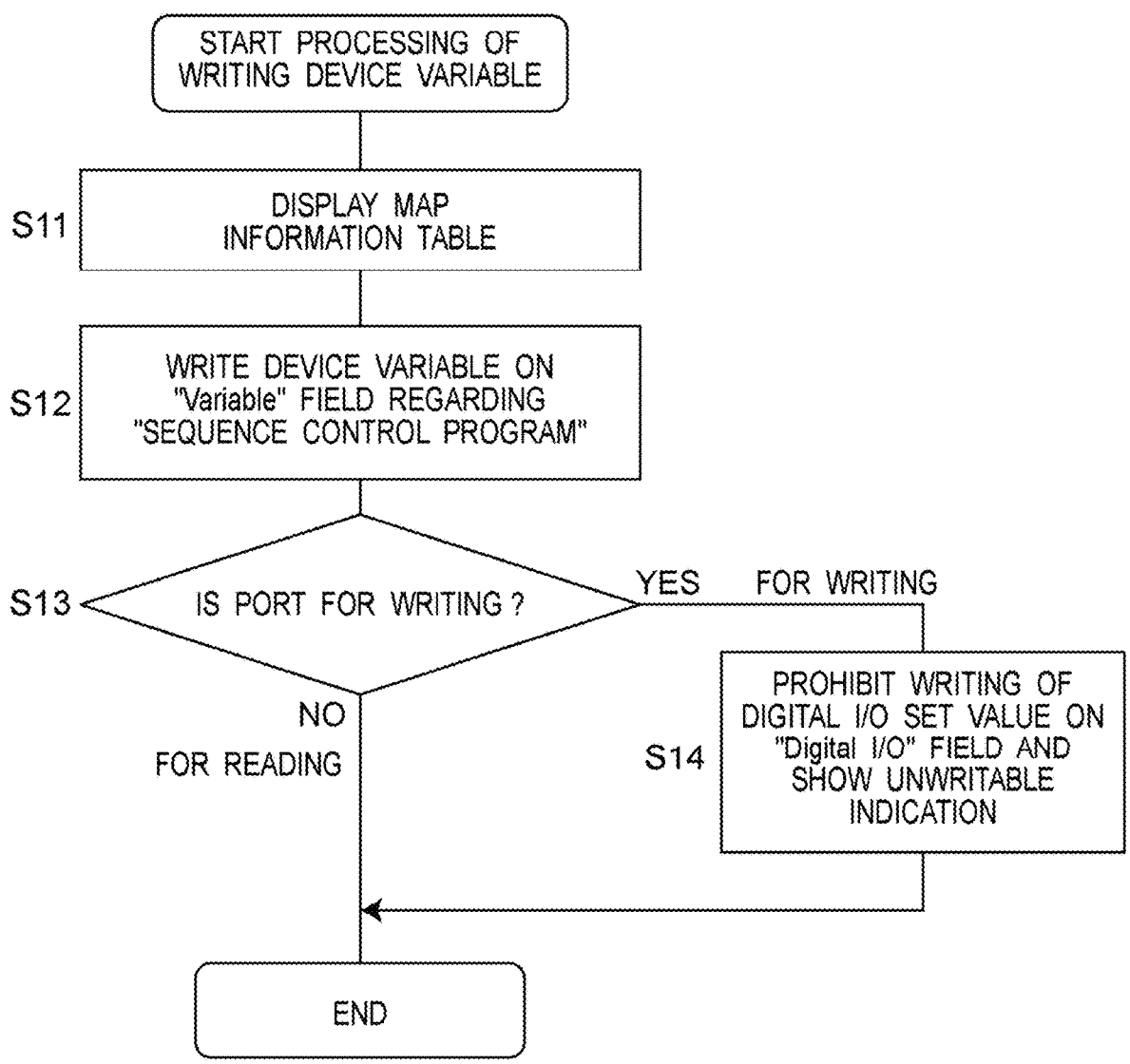
FIG. 5 is a diagram showing a flow of processing of writing a device variable on the "Variable" field of the map information table regarding the first program (sequence control program) in the first programming language (ladder language) by the programming assistance device.
Figure 6:
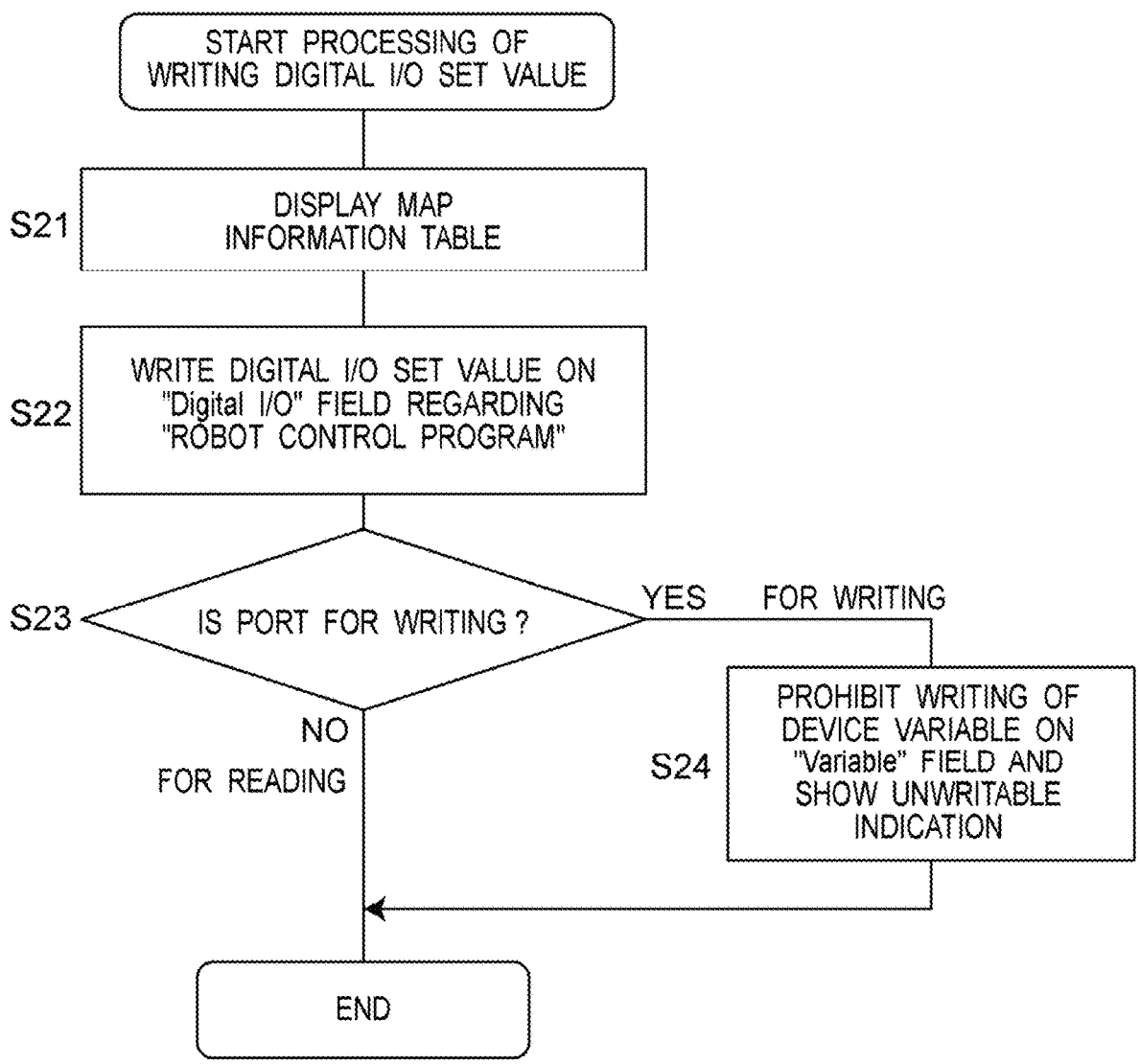
FIG. 6 is a diagram showing a flow of processing of writing a digital I/O set value on the "Digital I/O" field of the map information table regarding the second program (robot control program) in the second programming language (language originally developed by the present applicant) by the programming assistance device.

FIGS. 4 to 6 show the processing flow of the programming assistance method executed by the CPU 11 of the PC 10 in order to support the creation of the above-described "sequence control program" and "robot control program".

(Initial Display Processing)

Figure 7:
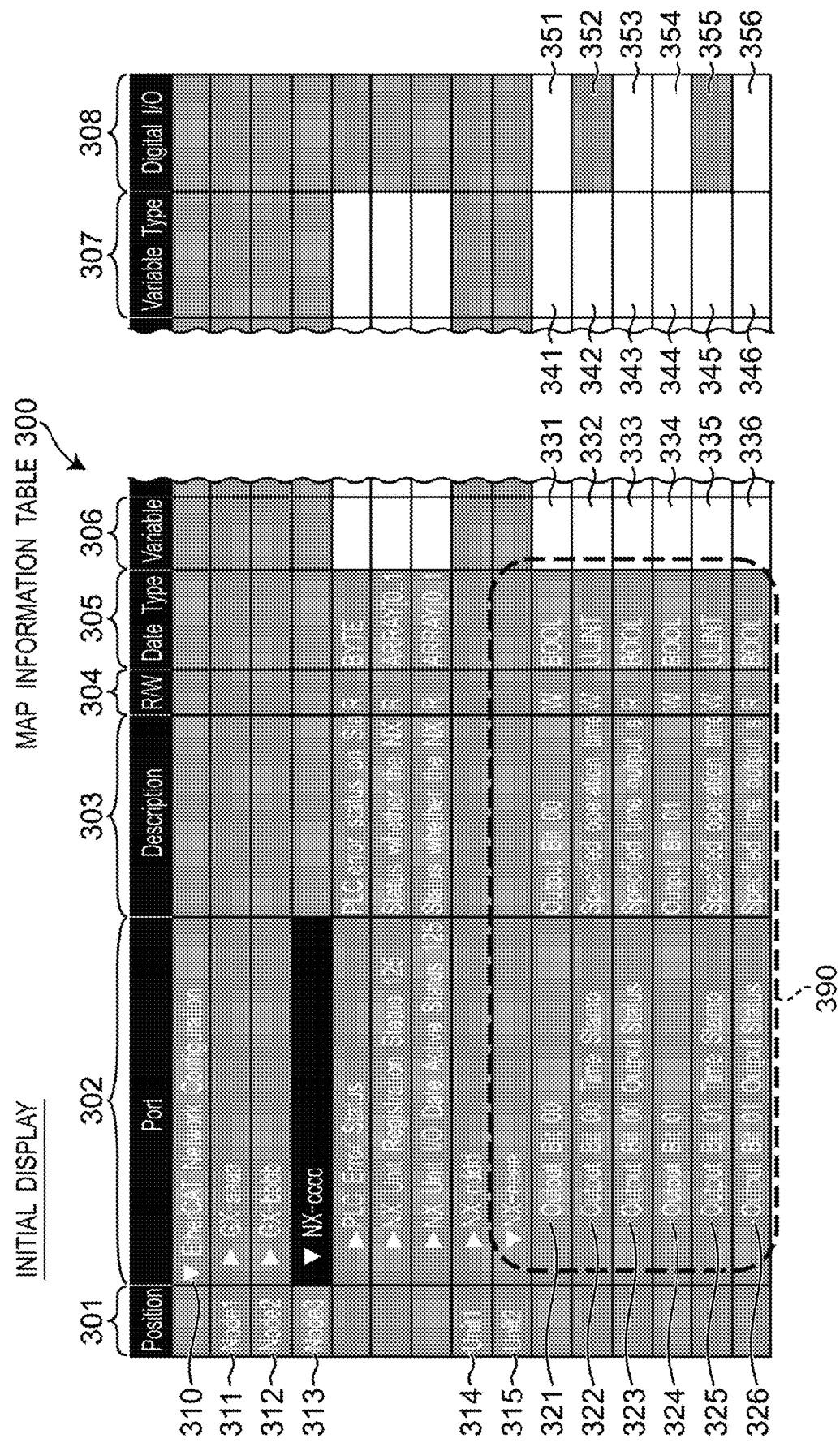
FIG. 7 is a diagram illustrating a map information table displayed by initial display processing on the display screen of the programming assistance device.

In the initial display processing shown in FIG. 4, first, as shown in step S1, the CPU 11 works as a display processing unit to display the map information table 300 (outer frame including the table heading thereof) as illustrated in FIG. 7 on the display screen of the display 12, and as shown in step S2, the CPU 11 reads the contents (configuration list) of the map information table from the map information storage unit 102 of the PLC 100 to display the hierarchical structure, in an expand state, between a plurality of I/O ports in the map information table 300.

As shown in FIG. 7, the map information table 300 includes, in order from the left to right, a "Position" field 301 indicating the position of each device in the system 400, a "Port" field 302 as a reference name field indicating each reference name, a "Description" field 303 indicating the description corresponding to each reference name, a "R/W" field 304 indicating whether the set value of each port is "W" for writing or "R" for reading during operation of the PLC 100, a "Data Type" field 305 as a data type field indicating the data type of the set value to be written for each port, a "Variable" field 306 as a first set value field on which the device variable is to be written for the sequence control program, a "Variable Type" field 307 where the type of the device variable is to be written, and a "Digital I/O" field 308 as the second set value field to which the digital I/O set value is to be written for the robot control program.

The "Position" field 301 and the "Port" field 302 described above represent the hierarchical structure in the EtherCAT (registered trademark) network of the device group included in the system 400. In this example, in the uppermost cell 310 of the "Port" field 302, "EtherCAT Network Configuration" indicating that the configuration is an EtherCAT (registered trademark) network is displayed. Below that, in cells 311, 312, and 313 of the "Position" field 301, the reference name "Node1" of the first node 201, the reference name "Node2" of the second node 202, and the reference name "Node3" of the third node 203 are displayed, respectively, in order from top to bottom. Corresponding to those cells 311, 312, and 313, the model numbers "GX-aaaa", "GX-bbbb", and "NX-cccc" of the respective nodes are displayed in the "Port" field 302. Furthermore, below that, in cells 314 and 315 of the "Position" field 301, the reference name "Unit1" of the first unit 204 and the reference name "Unit2" of the second unit 205 are displayed, respectively, in order from top to bottom. Corresponding to those cells 314 and 315, the model numbers "NX-dddd" and "NX-eeee" of the respective units are displayed in the "Port" field 302.

Furthermore, below that, in cells 321, 322, 323, 324, 325, and 326 of the "Port" field 302, the reference names "Output Bit 00", "Output Bit 00 Time Stamp", "Output Bit 00 Output Status", "Output Bit 01", "Output Bit 01 Time Stamp", and "Output Bit 01 Output Status" of the I/O ports 211, 212, 213, 214, 215, and 216 included in the second unit 205 (model number "NX-eeee") are displayed, respectively, in order from top to bottom. As surrounded and indicated by the broken line 390 in FIG. 7, this example focuses attention on the I/O ports 211 to 216 included in the second unit 205 (model number "NX-eeee").

In this example, as shown in the "R/W" field 304, the set value of each of the I/O port 211 (reference name "Output Bit 00"), the I/O port 212 (reference name "Output Bit 00 Time Stamp"), the I/O port 214 (reference name "Output Bit 01"), and the I/O port 215 (reference name "Output Bit 01 Time Stamp") is "W" for writing. On the other hand, the set value of each of the I/O port 213 (reference name "Output Bit 00 Output Status") and the I/O port 216 (reference name "Output Bit 01 Output Status") is "R" for reading.

In addition, in this example, as shown in the "Data Type" field 305, the data type of each of the I/O port 211 (reference name "Output Bit 00"), the I/O port 213 (reference name "Output Bit 00 Output Status"), the I/O port 214 (reference name "Output Bit 01"), and the I/O port 216 (reference name "Output Bit 01 Output Status") is the BOOLEAN type. On the other hand, the data type of each of the I/O port 212 (reference name "Output Bit 00 Time Stamp") and the I/O port 215 (reference name "Output Bit 01 Time Stamp") is the ULINT type. Here, the BOOLEAN type refers to a data type that takes two values of "true" and "false" being the truth values. The BOOLEAN type can be used for both a sequence control program and a robot control program. The ULINT type refers to a data type that takes an unsigned 64-bit integer value. The ULINT type can be used for a sequence control program, but cannot be used for a robot control program. Thus, in this map information table 300, the data type of the set value to be written on each of the I/O ports 211 to 216 is indicated in the "Data Type" field 305. Therefore, there is no possibility for each program author to make a mistake in the data type of the set value to be written.

Next, proceeding to step S3 in FIG. 4, the CPU 11 works as a data type determination unit, and determines, in this example, whether the data type of each of the I/O ports 211 to 216 of the second unit 205 (model number "NX-eeee") is a BOOLEAN type. That is, it is substantially determined whether the data type of each of the I/O ports 211 to 216 can be used for writing the set value for each program.

Here, as described above, since each of the data types of the I/O port 211 (reference name "Output Bit 00"), the I/O port 213 (reference name "Output Bit 00 Output Status"), the I/O port 214 (reference name "Output Bit 01"), and the I/O port 216 (reference name "Output Bit 01 Output Status") is BOOLEAN type (YES in step S3), the CPU 11 determines that they can be used for both writing the device variable on the "Variable" field 306 and writing the digital I/O set value on the "Digital I/O" field 308. Then, in step S4 in FIG. 4, the CPU11 works as a display processing unit, and, for those I/O ports 211, 213, 214, and 216, shows writable indication in the corresponding cells 331, 333, 334, and 336 in the "Variable" field 306, the corresponding cells 341, 343, 344, and 346 in the "Variable Type" field 307, and the corresponding cells 351, 353, 354, and 356 in the "Digital I/O" field 308 in FIG. 7, the indication indicating that each of the cells can be used for writing. In this example, as shown in FIG. 7, the writable indication corresponds to making those cells 331, 333, 334, and 336; 341, 343, 344, and 346; and 351, 353, 354, and 356 white (or light color).

On the other hand, since each of the data types of the I/O port 212 (reference name "Output Bit 00 Time Stamp") and the I/O port 215 (reference name "Output Bit 01 Time Stamp") is ULINT type (NO in step S3), the CPU 11 determines that they can be used for writing the device variable on the "Variable" field 306 but cannot be used for writing the digital I/O set value on the "Digital I/O" field 308. Then, in step S5 in FIG. 4, the CPU11 works as a display processing unit, and, for those I/O ports 212 and 215, shows the writable indication in the corresponding cells 332 and 335 in the "Variable" field 306 and the corresponding cells 342 and 345 in the "Variable Type" field 307 in FIG. 7, the indication indicating that each of the cells can be used for writing. Meanwhile, the CPU11 shows the unwritable indication, which indicates writing is not allowed, in the corresponding cells 352 and 355 in the "Digital I/O" field 308. In this example, the unwritable indication corresponds to making those cells 352 and 355 a dark color (meaning a color darker than the white or light color described above) as shown in FIG. 7. It should be noted that the unwritable indication is not limited to the indication in this mode, and, for example, may be indication in another mode such as hatching each cell (the same applies hereinafter). That is, the unwritable indication only needs to make the user be intuitively recognize that the field is non-writable when the user sees it.

The CPU 11 completes the initial display processing (FIG. 4) in this way. In this example, the map information table 300 created by the initial display process is stored in the storage unit 14 of the PC 10 and is stored in the map information storage unit 102 of the PLC 100. This map information table 300 is referred to during writing processing of the device variables on the "Variable" field 306 (FIG. 5) and/or writing processing of the digital I/O set values on the "Digital I/O" field 308 (FIG. 6) described next.

Here, in the map information table 300 shown in FIG. 7, the writable indication or the unwritable indication is applied to each cell of the "Variable" field 306, the "Variable Type" field 307, and the "Digital I/O" field 308. Therefore, the program author can intuitively visually know whether or not the set value can be written on each cell of the "Variable" field 306 and the "Digital I/O" field 308. Therefore, the program author who sees the unwritable indication does not uselessly attempt to write the set value on the set value field for the program determined that the above data type cannot be used for writing the above set value (in the above example, cells 352 and 355 for the robot control program).

In addition, in the map information table 300 described above, the set value field is divided into a "Variable" field 306 for the sequence control program and a "Digital I/O" field 308 for the robot control program. Therefore, regarding the sequence control program in the ladder language LD, the program author who creates the program is urged to write the device variable on the "Variable" field 306. On the other hand, regarding the robot control program in an original language, the program author who creates the program is urged to write the digital I/O set value on the "Digital I/O" field 308, if allowed. Therefore, even when program authors different from each other are in charge of creating the sequence control program and the robot control program, each program author does not hesitate about the field on which the set value is to be written.

(Writing Processing of Device Variable)

Figure 8:
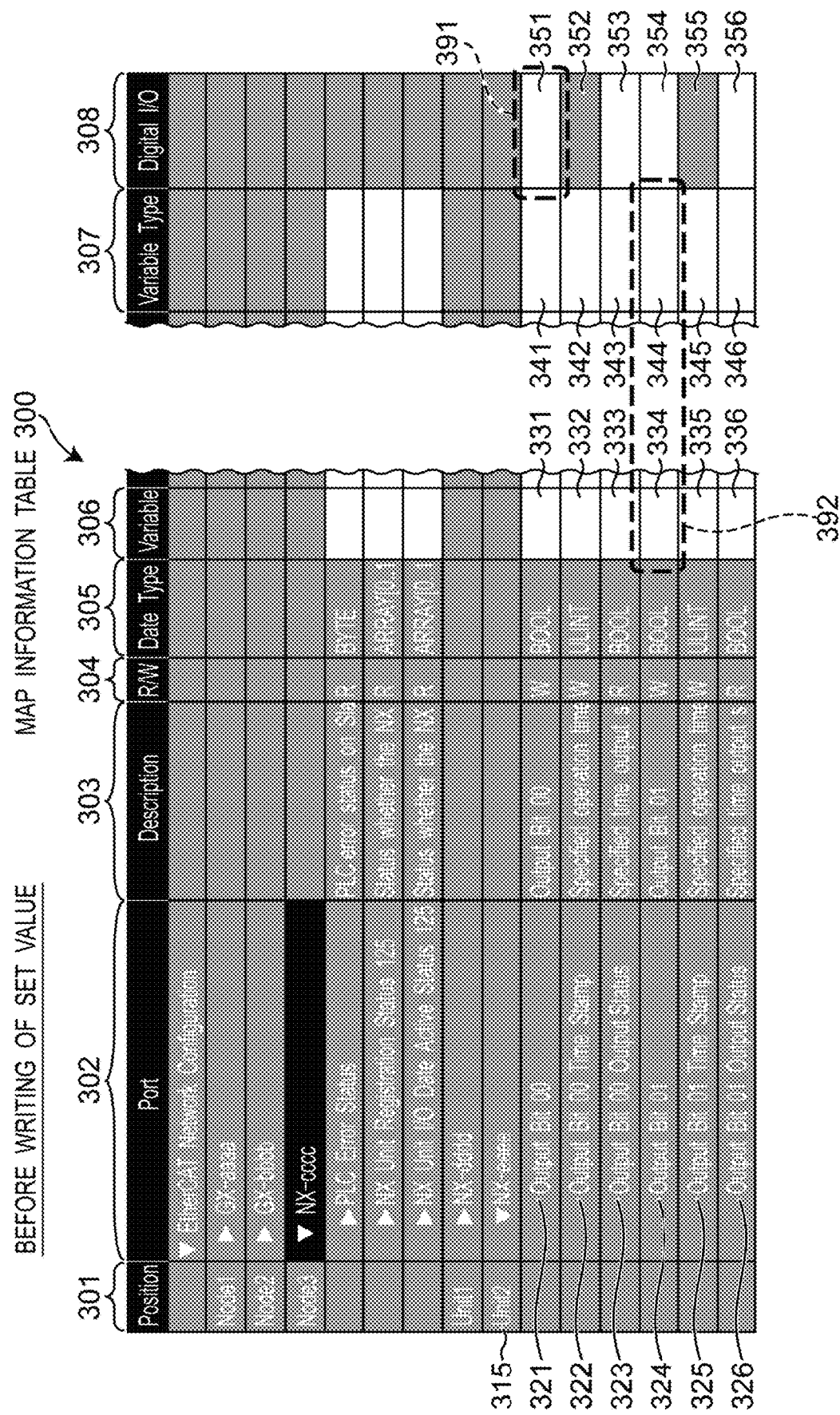
FIG. 8 is a diagram showing a state before writing of a set value on the map information table.

In the writing processing of the device variable shown in FIG. 5, first, as shown in step S11, the CPU 11 works as a display processing unit, and in this example, reads the map information table 300 (the same as that shown in FIG. 7 in this example) as illustrated in FIG. 8 from the storage unit 14 and displays it on the display screen of the display 12. It should be noted that the CPU 11 may read the contents (configuration list) of the map information table from the map information storage unit 102 of the PLC 100, and if the contents are updated, the CPU 11 may update and display the map information table 300.

Next, it is assumed that, regarding the sequence control program, for example, about the I/O port 211 (reference name "Output Bit 00"), via the operation unit 13, the user enters the device variable "N2_Output_Bit_00" in the corresponding cell 331 of the "Variable" field 306, and along with this, enters the device variable type "Global Variables" in the corresponding cell 341 of the "Variable Type" field 307. Then, in step S12 in FIG. 5, the CPU 11 works as a writing determination unit, determines that the set value has been written for the I/O port 211 as shown in FIG. 9, and writes and displays the device variable "N2_Output_Bit_00" on the cell 331 of the "Variable" field 306. Along with this, the CPU 11 writes and displays the device variable type "Global Variables" on the cell 341 of the "Variable Type" field 307.

Figure 9:
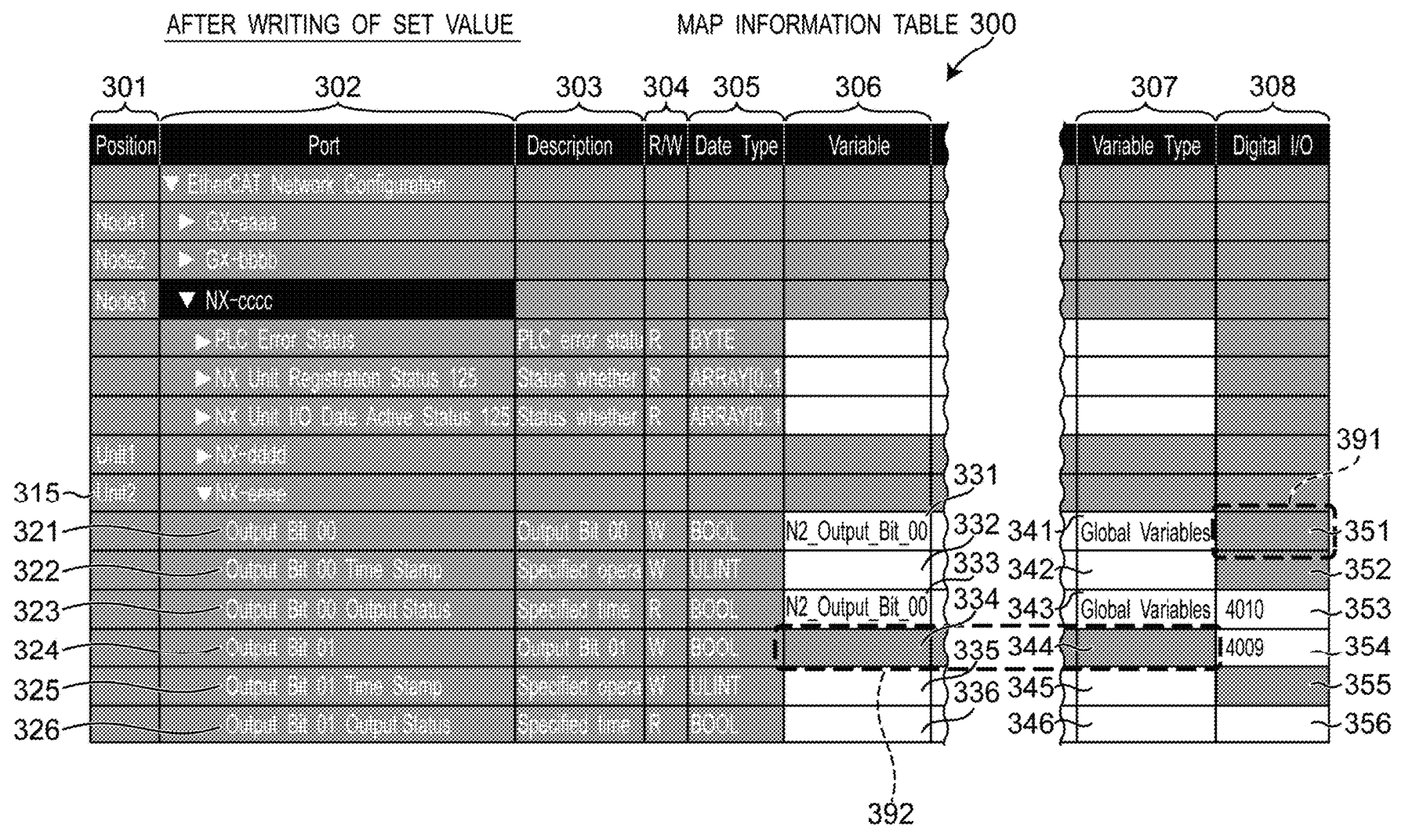

Next, in step S13 in FIG. 5, the CPU 11 refers to the "R/W" field 304 shown in FIG. 9 to determine whether or not the I/O port 211 is a port for writing. In this example, since the I/O port 211 is a port of "W" for writing (YES in step S13), in step S14 in FIG. 5, the CPU 11 works as an overwriting prohibition unit, and prohibits the set value from being written on the corresponding cell 351 of the "Digital I/O" field 308 for that I/O port 211 in this example. Along with this, the CPU 11 works as a display processing unit and shows unwritable indication in the cell 351 of the "Digital I/O" field 308 to indicate that the digital I/O set value cannot be written on the cell. In this example, the unwritable indication corresponds to making the cell 351 a dark color, as surrounded and indicated by the broken line 391 in FIG. 9 (Compare with the original white or light color surrounded and indicated by the broken line 391 in FIG. 8).

Therefore, the program author who sees the unwritable indication does not uselessly attempt to write the set value on the set value field (in the above example, the cell 351 of the "Digital I/O" field 308) on which writing of the above set value is prohibited.

It should be noted that in step S12 in FIG. 5, if the cell on which the set value is written is, for example, the cell 333 or 343 corresponding to the I/O port 213 (reference name "Output Bit 00 Output Status"), since the I/O port 213 is a port of "W" for reading (NO in step S13), as shown in FIG. 9, the CPU 11 allows writing of the set value on the corresponding cell 353 of the "Digital I/O" field 308 for the I/O port 213. Therefore, it is possible to write the set value for the robot control program on the cell 353. In this example, a value 4010 is written on the cell 353, as shown in FIG. 9.

(Writing Processing of Digital I/O Set Value)

In the writing processing of the digital I/O set value shown in FIG. 6, first, as shown in step S21, the CPU 11 works as a display processing unit, and in this example, reads the map information table 300 (the same as that shown in FIG. 7 in this example) as illustrated in FIG. 8 from the storage unit 14 and displays it on the display screen of the display 12. It should be noted that in the same manner as described for step S11 in FIG. 5, if the CPU 11 may read the contents (configuration list) of the map information table from the map information storage unit 102 of the PLC 100, and if the contents are updated, the CPU 11 may update and display the map information table 300.

Next, it is assumed that regarding the robot control program, for example, about the I/O port 214 (reference name "Output Bit 01"), via the operation unit 13, the user enters the digital I/O set value (a value of 4009 in this example) in the cell 354 of the "Digital I/O" field 308. Then, in step S22 in FIG. 5, the CPU 11 works as a writing determination unit, and as shown in FIG. 9, writes and displays the digital I/O set value (a value of 4009 in this example) in the cell 354 of the "Digital I/O" field 308.

Next, in step S23 in FIG. 6, the CPU 11 refers to the "R/W" field 304 shown in FIG. 9 to determine whether or not the I/O port 214 is a port for writing. In this example, since the I/O port 214 is a port of "W" for writing (YES in step S23), in step S24 in FIG. 6, the CPU 11 works as an overwriting prohibition unit, and prohibits the set value from being written on the corresponding cell 334 of the "Variable" field 306 and the corresponding cell 344 of the "Variable Type" field 307 for that I/O port 214 in this example. Along with this, the CPU 11 works as a display processing unit and shows unwritable indication, which indicates writing is not allowed, in the cell 334 of the "Variable" field 306 and the cell 344 of the "Variable Type" field 307. In this example, the unwritable indication corresponds to making the cells 334 and 344 a dark color, surrounded and indicated by the broken line 392 in FIG. 9 (Compare with the original white or light color surrounded and indicated by the broken line 392 in FIG. 8).

Therefore, the program author who sees the unwritable indication does not uselessly attempt to write the set value on the set value field (in the above example, the cells 334 and 344 of the "Variable" field 306) on which writing of the above set value is prohibited.

It should be noted that in step S22 in FIG. 6, if the cell on which the set value is written is, for example, the cell 353 corresponding to the I/O port 213 (reference name "Output Bit 00 Output Status"), the I/O port 213 is a port of "W" for reading (NO in step S23). Thus, as shown in FIG. 9, the CPU 11 allows writing of the set value on the corresponding cell 333 of the "Variable" field 306 and the corresponding cell 343 of the "Variable Type" field 307 for the I/O port 213. Therefore, it is possible to write the set values for the sequence control program on the cells 333 and 343. In this example, as shown in FIG. 9, the device variable "N2_Output_Bit_00" is written on the cell 333. In addition, along with that, the device variable type "Global Variables" is written on the cell 343.

Thus, according to the programming assistance method, a function of prohibiting overwriting of a set value on a device port can be exerted on program creation in a plurality of program languages different from each other. Therefore, the program author who creates each program can create a program while appropriately referring to the map information table 300 on which the set values are appropriately written in this way. Thus, the set values for a plurality of device ports are in the state intended by each program author.

It should be noted that, if a user has given, via the operation unit 13, an instruction (instruction to release writing prohibition) regarding the set value field (cell 351 of the "Digital I/O" field 308 shown in FIG. 9) on which writing of the set value is prohibited in step S14 in FIG. 5 and the set value field (cell 334 of the "Variable" field 306 and cell 344 of the "Variable Type" field 307 shown in FIG. 9) on which writing of the set value is prohibited in step S24 in FIG. 6, the CPU 11 may release the writing prohibition of the above set value to eliminate the unwritable indication. Thus, the convenience of the user can be improved according to the situation of program creation.

In the above-described embodiment, the first programming language is a ladder language LD, and the second programming language is a language originally developed by the present applicant, but the present invention is not limited thereto. The present invention can be widely applied to a plurality of programming languages different from each other.

The above programming assistance method may be recorded as software (computer program) on a recording medium that can store data non-transitorily, such as a compact disc (CD), a digital versatile disc (DVD), or a non-volatile memory. Installing the software recorded on such a recording medium on practical computer apparatuses such as a personal computer and a personal digital assistant (PDA) can cause those computer apparatuses to execute the above-described programming assistance method.

As described above, a programming assistance device according to the present disclosure is a programming assistance device configured to support program creation in a plurality of programming languages for a system including a plurality of device ports, the programming assistance device comprising:

a display processing unit configured to display a map information table as a list on a display screen, the map information table associating a reference name field representing each of the plurality of device ports with a set value field for each device port;

a writing determination unit configured to determine whether a set value has been written on the set value field for each of the device ports regarding a first program in a first programming language; and an overwriting prohibition unit configured to prohibit writing of a set value on the set value field regarding a second program in a second programming language, which is different from the first programming language, for a device port for which it is determined that a set value has been written on the set value field regarding a first program in the first programming language.

Herein, the "device port" broadly refers to a port on which a set value to be referred to during program execution is to be written or has been written, such as a physical I/O (input/output interface) port.

In addition, writing of a set value on the set value field can be performed by an input via an operation unit such as a keyboard or a mouse.

In the programming assistance device of the present disclosure, a display processing unit displays a map information table as a list on a display screen, the map information table associating a reference name field representing each of the plurality of device ports with a set value field for each device port. A writing determination unit determines whether a set value has been written on the set value field for each of the device ports regarding a first program in a first programming language. An overwriting prohibition unit prohibits writing of a set value on the set value field regarding a second program in a second programming language, which is different from the first programming language, for a device port for which it is determined that a set value has been written on the set value field regarding a first program in the first programming language. Therefore, the program author does not mistakenly write (overwrite) a set value on the set value field regarding a second program in the second programming language, for a device port for which it is determined that a set value has been written on the set value field regarding a first program in the first programming language. That is, according to the programming assistance device, a function of prohibiting overwriting of a set value on a device port can be exerted on program creation in a plurality of program languages different from each other. Therefore, the program author who creates each program can create a program while appropriately referring to the map information table on which the set values are appropriately written in this way. Thus, the set values for the plurality of device ports are in the state intended by each program author.

In the programming assistance device of one embodiment, the set value field is divided into a first set value field for the first program and a second set value field for the second program.

In the programming assistance device of this one embodiment, regarding the first program in the first programming language, the program author who creates the program writes the set value on the first set value field. On the other hand, regarding the second program in the second programming language, the program author who creates the program writes the set value on the second set value field, if permitted (unless prohibited by the overwriting prohibition unit). Therefore, even when program authors different from each other are in charge of creating the first and second programs, each program author does not hesitate about the field on which the set value is to be written.

In the programming assistance device of one embodiment, the display processing unit shows unwritable indication, which indicates that writing is not allowed, in the second set value field on which writing of the set value is prohibited.

In the programming support device of this one embodiment, the display processing unit shows unwritable indication, which indicates that writing is not allowed, in the second set value field of the device port on which writing of the set value is prohibited. Therefore, the program author who sees the unwritable indication does not uselessly attempt to write the set value on the second set value field on which writing of the set value is prohibited.

In the programming assistance device of one embodiment, the map information table further includes a data type field indicating a data type of a set value to be written for each of the device ports.

In the programming assistance device of this one embodiment, the data type of the set value to be written on each of the device ports is indicated in the data type field of the map information table. Therefore, there is no possibility for each program author to make a mistake in the data type of the set value to be written.

The programming assistance device of one embodiment, further comprises a data type determination unit configured to determine whether a data type indicated in the data type field for each of the device ports can be used for writing the set value for each program, wherein the display processing unit shows unwritable indication, which indicates that writing is not allowed, in a set value field for a program for which the data type is determined to be unusable for writing the set value for each of the device ports.

In the programming assistance device of this one embodiment, the data type determination unit determines whether the data type indicated in the data type field for each of the device ports can be used for writing the set value regarding each of the programs. The display processing unit shows the unwritable indication, which indicates that writing is not allowed, in a set value field for a program for which the data type is determined to be unusable for writing the set value for each of the device ports. Therefore, the program author who sees the unwritable indication does not uselessly attempt to write the set value on the set value field for the program determined that the above data type cannot be used for writing the above set value.

In another aspect, a programming assistance method according to the present disclosure is a programming assistance method for supporting program creation in a plurality of programming languages for a system including a plurality of device ports, the programming assistance method comprising:
  displaying a map information table as a list on a display screen, the map information table associating a reference name field representing each of the plurality of device ports with a set value field for each device port;
  determining whether a set value has been written on the set value field for each of the plurality of device ports regarding a first program in a first programming language; and
  prohibiting writing of a set value on the set value field regarding a second program in a second programming language, which is different from the first programming language, for a device port for which it is determined that a set value has been written on the set value field regarding a first program in the first programming language.

According to the programming assistance method of the present disclosure, the function of prohibiting overwriting of the set value on the device port can be exerted on the program creation in a plurality of programming languages different from each other. Therefore, the program author who creates each program can create a program while appropriately referring to the map information table on which the set values are appropriately written in this way. Thus, the set values for the plurality of device ports are in the state intended by each program author.

In yet another aspect, a computer-readable recording medium according to the present disclosure is a computer-readable recording medium non-transitorily storing a program for causing a computer to execute the above programming assistance method.

By making a computer read the program stored in the computer-readable recording medium according to the present disclosure and causing the computer to execute the program, the above programming assistance method can be implemented.

As is clear from the above, according to the programming assistance device and the programming assistance method of the present disclosure, the function of prohibiting overwriting of the set value on the device port can be exerted on the program creation in a plurality of programming languages different from each other. In addition, by making a computer read the program stored in the computer-readable recording medium according to the present disclosure and causing the computer to execute the program, the above programming assistance method can be implemented.

The above embodiments are illustrative, and various modifications can be made without departing from the scope of the present invention. Each of the above embodiments can be implemented independently, but combinations of the embodiments are also possible. In addition, various features in different embodiments can also be independently implemented, but combinations of features in different embodiments are also possible.

The invention claimed is:

1. A programming assistance device configured to support program creation in a plurality of programming languages for a system including a plurality of device ports, the programming assistance device comprising:
 a processor; and
 a memory comprising instructions executed by the processor to configure the programming assistance device to:
 display a map information table as a list on a display screen, the map information table associating a reference name field representing each of the plurality of device ports with a set value field for each of the plurality device port, wherein the set value field is divided into a first set value field for a first program and a second set value field for a second program;
 determine whether a first set value has been written on the first set value field for each of device ports regarding the first program in a first programming language; and
 prohibit writing of a second set value on the second set value field regarding the second program in a second programming language, which is different from the first programming language, for a device port which it is determined that the first set value has been written on the first set value field regarding the first program in the first programming language.

2. The programming assistance device according to claim 1, wherein the display screen shows unwritable indication, which indicates that writing is not allowed, in the second set value field on which writing of the second set value is prohibited.

3. The programming assistance device according to claim 1, wherein the map information table further includes a data type field indicating a data type of a set value to be written for each of the device ports.

4. The programming assistance device according to claim 3, further comprising determine whether the data type indicated in the data type field for each of the plurality device ports can be used for writing the set value for each program,
 wherein the display screen shows unwritable indication, which indicates that writing is not allowed, in a set value field for a program which the data type is determined to be unusable for writing the set value for each of the plurality device ports.

5. A programming assistance method for supporting program creation in a plurality of programming languages for a system including a plurality of device ports, the programming assistance method comprising:
 displaying a map information table as a list on a display screen, the map information table associating a reference name field representing each of the plurality of device ports with a set value field for each of the plurality device port, wherein the set value field is divided into a first set value field for a first program and a second set value field for a second program;
 determining whether a first set value has been written on the first set value field for each of plurality of device ports regarding the first program in a first programming language; and
 prohibiting writing of a second set value on the second set value field regarding the second program in a second programming language, which is different from the first programming language, for a device port which it is determined that the first set value has been written on the first set value field regarding the first program in the first programming language.

6. A non-transitorily computer-readable recording medium storing a program for causing a computer to execute a programming assistance method for supporting program creation in a plurality of programming languages for a system including a plurality of device ports, the programming assistance method comprising:
 displaying a map information table as a list on a display screen, the map information table associating a reference name field representing each of the plurality of device ports with a set value field for each of the plurality device port, wherein the set value field is divided into a first set value field for a first program and a second set value field for a second program;
 determining whether a first set value has been written on the set first value field for each of the plurality of device ports regarding the first program in a first programming language; and
 prohibiting writing of a second set value on the second set value field regarding a second program in a second programming language, which is different from the first programming language, for a device port which it is determined that the first set value has been written on the first set value field regarding the first program in the first programming language.

* * * * *